W. H. RICE.
AGRICULTURAL IMPLEMENT.
APPLICATION FILED SEPT. 15, 1909.

1,034,734.

Patented Aug. 6, 1912.

UNITED STATES PATENT OFFICE.

WILLIAM H. RICE, OF ROCHESTER, NEW YORK.

AGRICULTURAL IMPLEMENT.

1,034,734.   Specification of Letters Patent.   Patented Aug. 6, 1912.

Original application filed January 8, 1909, Serial No. 471,329. Divided and this application filed September 15, 1909. Serial No. 517,841.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

The present invention relates to agricultural implements and it has for an object to protect against the action of stones, dirt or other material the forward and under portion of an endless conveyer and separator used to separate potatoes and like growing articles from the earth in which they grow.

To these and other ends the invention consists in certain improvements and combinations of parts all as will be hereinafter more fully described, the novel features being pointed out in the claims at the end of the specification.

Figure 1:
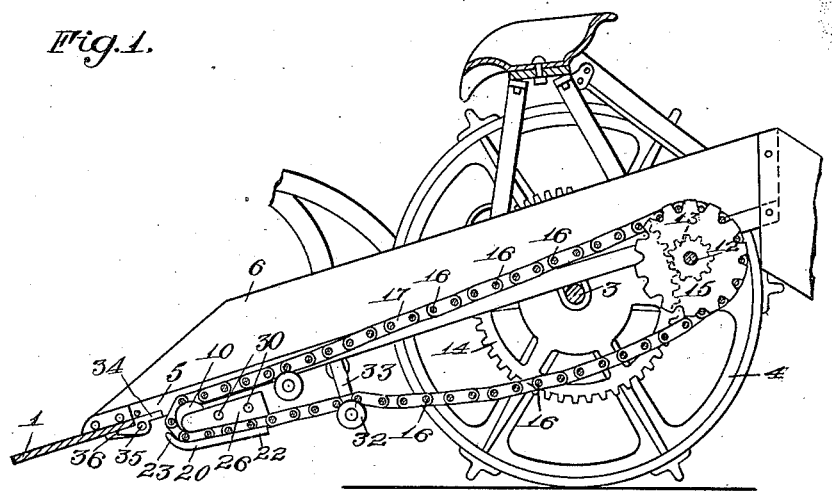
Figure 4:
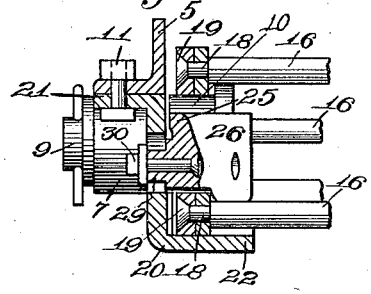
Figure 2:
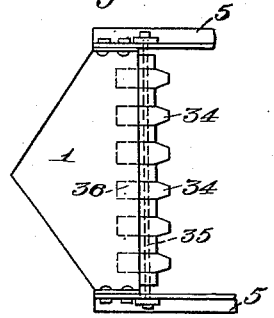
Figure 3:
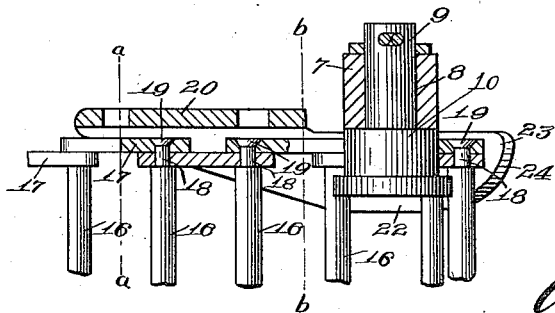
Figure 5:
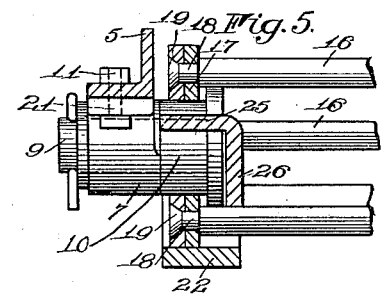

In the drawings: Figure 1 is a longitudinal sectional view of a potato digger embodying my improvements. Fig. 2 is a plan view of the excavator and parts in proximity thereto; Fig. 3 is a horizontal section; Fig. 4 is a section on line *a—a* of Fig. 3, and Fig. 5 is a section on line *b—b* of Fig. 3.

The subject matter of this invention has been divided from an application filed by me and on which Letters Patent No. 934,934, issued September 21, 1909, which was divided from an application filed by me on which Letters Patent, No. 980,335, issued Jan. 3, 1911.

In the present embodiment of the invention there is employed a frame which preferably comprises an excavator 1 adapted to penetrate the earth, and side pieces extending rearwardly therefrom and supported near their rear ends on the axle 3 carrying the ground wheels 4. The side pieces may be in the form of angle bars 5 each having its lower horizontal flange secured to the axle 3 and a vertical side plate 6 secured to and extending upwardly from its horizontal flange.

Preferably arranged between the sides of the main frame and supported at its forward end in proximity to the excavator and at its rear end near the rear end of the main frame, is a conveyer in the form of an endless chain embodying rods 16 extending transversely between the sides of the frame and connected at their ends by links 17, each of the rods in this instance being reduced at 18 and having the ends of the links 17 turning thereon and secured thereto by upsetting the ends of the rods at 19.

The forward end of the conveyer is preferably supported in proximity to the excavator by guiding pulleys or wheels 10 located at opposite sides of the conveyer and each having an integral stud 9 turning in a bearing 8 that is formed in a bracket 7 preferably detachably secured to the under side of an angle bar 5 by bolts 11. The outer end of each roller may be provided with an annular flange or rim which engages the rods of the conveyers as they travel around. The rear end of the conveyer may be supported by sprocket wheels 15 arranged on a transversely extending shaft 12 that is driven by a pinion 13 thereon meshing with a large gear 14 on the wheel 4.

The edges of the lower part of the conveyer may be supported above the earth to protect the conveyer against stones or the like and at the same time to prevent its digging into the earth. The supports in this instance are in the form of runners 20, each bolted to one of the angle bars 5 at 21 and extending laterally at 22 beneath the proximate pulley and the conveyer to form a shoe, the forward end of which is turned or deflected upwardly at 23 and has its inner edge beveled or inclined at 24 to deflect stones and other obstacles inwardly and beyond the inner side of the proximate pulley. The lower lap of the conveyer may be held in alinement with the shoes by pulleys 32 suspended by arms 33 from the side pieces of the frame. The runners 20 may also serve as a support for guard or shield strips 26 which converge toward each other on opposite sides of the conveyer. These guards are not claimed specifically herein as they form part of the subject matter of my prior Patent No. 934934. Preferably each guard is loosely mounted on the runner and to this end each of the latter is provided with vertically arranged slots in which work integral bosses 29 on the guard, bolts 30 serving to hold the guards in position. Each guard has a top 25 extending laterally from its upper edge covering the space between it and the adjacent vertical face of the runner 20.

The space between the forward end of the conveyer and the rear end of the excavator, or shovel, is closed by a plurality of gates 34 pivoted side by side for independent movement on the transversely extending shaft 35 and held in a normal position by fingers 36 engaging the lower side of the shovel. The rear ends of the gates are pointed or tapered and lie in proximity to the conveyer so as to provide an apron which will conduct all the material received by the shovel onto the conveyer. The points of the gates being separated they are only required to move or yield slightly upward to allow articles lodged on the conveyer to pass upwardly beneath them.

In operation, the machine is drawn forwardly by any suitable draft means causing the earth to be excavated and carried upwardly onto the conveyer, the space between the excavator and the conveyer being bridged by the gates which yield upwardly when stones or other material are caught in the conveyer and carried completely around to the gates. The shoes 22 deflect the stones on the under side of the lower lap of the conveyer away from the pulleys and also deflect material in advance of the conveyer away from the pulleys, while the guard faces 26 of the shield act to deflect stones away from the pulleys on the upper side of the lower lap, and the tops 25 prevent stones wedging behind the shields 26.

I claim as my invention.

1. In a digger, the combination with an excavator and an endless conveyer receiving material therefrom, of pulleys for supporting one end of the conveyer in proximity to the excavator, and runners located beneath the pulleys and the lower side of the conveyer and supporting the conveyer as it passes below the pulleys out of engagement with the ground.

2. In a digger, the combination with an excavator and an endless conveyer, of means on the frame for supporting the forward end of the conveyer in proximity to the excavator, and supports on the frame extending laterally therefrom beneath the edges of the conveyer forming supports for the latter.

3. In a digger, the combination with a frame having an excavator thereon and side pieces extending rearwardly from the excavator, of an endless conveyer operating between the side pieces, pulleys guiding the conveyer in proximity to the excavator, and runners extending beneath the pulleys and the conveyer and upwardly in advance of the latter and having their forward ends tapered.

4. In a digger, the combination with a frame having an excavator thereon and side pieces extending rearwardly therefrom, of an endless conveyer operating between the side pieces, pulleys for supporting the conveyer in proximity to the excavator, runners depending from the side pieces in proximity to the pulleys, and shields for the rear faces of the pulleys loosely secured to the runners and coöperating with the lower lap of the endless conveyer.

WILLIAM H. RICE.

Witnesses:
RUSSELL B. GRIFFITH,
HAROLD H. SIMMS.

Copies of this patent may be obtained for five cents each, by addressing the "Commissioner of Patents, Washington, D. C."